United States Patent [19]

Smith

[11] 4,313,792
[45] Feb. 2, 1982

[54] MINIATURE GAMMA THERMOMETER SLIDEABLE THROUGH BORE FOR MEASURING LINEAR HEAT GENERATION RATE

[75] Inventor: Robert D. Smith, Bethesda, Md.
[73] Assignee: Scandpower, Inc., Bethesda, Md.
[21] Appl. No.: 48,032
[22] Filed: Jun. 13, 1979
[51] Int. Cl.³ ............................................. G21C 17/00
[52] U.S. Cl. .................................................. 376/247
[58] Field of Search ............... 176/19 R, 19 EC, 19 J; 73/1 F; 136/233

[56] References Cited

U.S. PATENT DOCUMENTS

| | | | |
|---|---|---|---|
| 3,064,245 | 11/1962 | Lindberg | 73/1 F |
| 3,245,248 | 4/1966 | Ritter | 73/1 F |
| 3,459,925 | 8/1969 | Goosey et al. | 176/19 R |
| 3,499,310 | 3/1970 | Hundere et al. | 73/1 F |
| 3,511,091 | 5/1970 | Thome | 176/19 R |
| 3,599,474 | 8/1971 | Brown et al. | 73/1 F |
| 3,716,450 | 2/1973 | Lions | 176/19 R |
| 3,727,460 | 4/1973 | Franconi | 176/19 R |
| 3,751,333 | 8/1973 | Drummond et al. | 176/19 R |
| 3,848,466 | 11/1974 | Dial et al. | 176/19 R |
| 4,041,382 | 8/1977 | Washburn | 73/1 F |
| 4,162,175 | 7/1979 | Salt et al. | 176/19 J |

FOREIGN PATENT DOCUMENTS

| | | | |
|---|---|---|---|
| 744908 | 1/1970 | Belgium | 176/1 R |
| 1406368 | 7/1965 | France | 176/19 R |
| 5030232 | 3/1970 | Japan | 176/19 R |
| 505910 | 5/1976 | U.S.S.R. | 73/1 F |

OTHER PUBLICATIONS

Instruments & Control Systems (5/64) p. 91.

*Primary Examiner*—Sal Cangialosi
*Attorney, Agent, or Firm*—Eric P. Schellin

[57] ABSTRACT

A gamma thermometer for use with a nuclear reactor is provided with two thermocouple junctions which are connected so as to output the difference voltage. The two thermocouple junctions are spaced closely enough so that, considering the scale of the nuclear reactor, they experience the same gamma-ray flux. However, the thermal paths to a common heat sink for the two thermocouple junctions are different, so that the junctions exhibit a temperature difference which depends on, and therefore measures, the heating produced by the gamma-ray flux and, thereby, the gamma-ray flux itself. The gamma thermometer is built on a miniature scale, so that it can be traversed through a small, often dry, bore extending through the core of a nuclear reactor. The temperature difference mentioned above will be affected to some extent by the temperature of the common heat sink. Therefore, to increase accurate repeatability of computed measurement, a thermocouple junction is used to measure the temperature of the common heat sink and, further, a thermal heat bridge may be used to thermally link the common heat sink to the bore.

6 Claims, 5 Drawing Figures

MINIATURE GAMMA THERMOMETER SLIDEABLE THROUGH BORE FOR MEASURING LINEAR HEAT GENERATION RATE

RELATED APPLICATIONS

The moveable gamma thermometer of this application is adapted to be used, during the steady state high flux operation of the nuclear reactor, to calibrate the multiple gamma thermometers of the fixed gamma thermometer array of a prior application, Ser. No. 888,881
Filed: Mar. 21, 1978
By: Erik Rolstad et al.
For: Apparatus for determining the local power generation in a nuclear reactor fuel assembly.

BRIEF SUMMARY AND BACKGROUND OF INVENTION

This invention relates to the measurement of a quantity, linear heat generation rate, often abbreviated LHGR. The word linear is used because the quantity is a measure of the heat generated within one unit length of the fuel pin of a nuclear reactor. The LHGR of a fuel pin will be different at different locations along its length since fission depends, in part, on proximity of other sources of radioactivity.

The quantity is important since, if the quantity goes too high, the cladding of the fuel pins is in danger of melting. Thus, the linear heat generation rate is as important to safe nuclear reactor operation as is reliability of coolant flow.

The gamma thermometer array of the above-identified Rolstad et al. application contains a plurality of thermocouples which operate at individual temperatures which are multivariable functions of the local heat generation rate and the individual thermal resistance between the thermocouples and their respective heat sinks, cooled by the circulating reactor coolant. The said individual thermal resistance to the respective heat sink, whether the reactor be boiling or pressurized, is accurately known, and thus the local heat generating rates can be calculated from the readings of the plural thermocouples.

The calculation of local heat generating rate from the data furnished by the gamma thermometer array of Rolstad et al. is fairly straightforward and simple compared to the corresponding calculation required to determine the same quantity using data furnished by the more common miniature fission chambers and self-powered neutron detectors, which respond almost entirely to thermal neutrons. The latter calculations must take into account the variability among the individual sensors, and must also be corrected for the continuous depletion of emitter material in the sensor.

Furthermore, the local thermal neutron flux, as calculated from the corrected output of miniature fission chambers and self-powered neutron detectors, must be converted into local heat generation rate by a complex calculation which takes into account the fact that, as the $U^{235}$ of the reactor is being depleted by the fission process, the local heat generating rate goes down, but the local thermal neutron flux goes up. Thus, the quantity being directly measured and the calculated quantity of interest are inversely and very complexly related. The situation often arises that the magnitude of the corrections to the basic signal is three times larger than that of the basic signal itself.

A problem with neutron sensors is that they cannot be manufactured identically. Furthermore, they cannot be calibrated reliably before being placed in service, because there is no source of sufficient neutron flux, outside of a reactor, to calibrate them. In the event such source were available, the radioactivity induced by calibration would render further handling economically impracticable.

In contrast, and uniquely for such instruments, gamma thermometers can be manufactured nearly identically, and can be tested at the point of manufacture to prove the relationship of each signal output to the heat generated in the sensors. Their signals can thus be relied upon to reflect accurately the heat being generated within the sensors and data, available in the open literature, establish that the heat to signal relationship is constant for many years.

There does remain, however, the problem of relating the measured heat generation rate in the sensor to the unknown LHGR of adjacent fuel pins which the sensors purport to measure.

The single available truly independent measurement against which this property can be tested in any light water reactor is the average fuel LHGR, which is determined by calorimetry. To determine average fuel LHGR the total heat being generated in the core is calculated by combining measurements of total mass flow and temperature rise of the coolant and small corrections made for heat not being generated in the fuel pins themselves. By dividing the total heat rate so obtained by the total length of fuel in the core an average value of LHGR is obtained.

The distributed in-core sensors, however, purport to measure local LHGR, not average heat rate. If a reactor contained a large number of such sensors uniformly distributed, their signals could be averaged and compared to, and uniformly corrected if necessary, for changes in the ratio of average signal to average LHGR, which changes might take place over the several year lifetime of the fuel assemblies.

In accordance with the instant invention, a traveling miniature gamma thermometer is provided, and is caused to travel through bores which are distributed in an array through the reactor core.

In some cases the traveling gamma thermometer would have to be on a miniature scale, compared to gamma thermometers of the prior art, in order to be able to fit, for example, in a dry bore located in the inner rod of the gamma thermometer of the Rolstad application. In other cases diameters up to ¼ or ⅜ inch might be allowable when used in the in-core instrument thimbles employed in many reactors.

The traveling gamma thermometer need not be precisely calibrated during manufacture, since its inherent stability permits it to correctly reflect differing relative levels of activity as it is traversed through the nuclear reactor core, unless extremely poor thermal contact between the traveling gamma thermometer and the associated bore should cause the unit to be many degrees hotter; on the order of 100° C., than its nominal value.

This stability, during the core scanning, permits the construction of an accurate three dimensional relative gamma flux activity level plot of the reactor core. With the use of calorimetry, the relative gamma levels are readily changed to LHGR levels by determining the ratio between average gamma ray activity and average LHGR and correcting local readings by this ratio.

Thus, the minature traveling gamma thermometer of this invention is adapted to scan the cross sections of a reactor core to determine the levels of activity at different locations in the core, and the results of such scanning can be used to determine LHGRs within the core and, if the reactor is so equipped, to verify theoretical calibrations of the in-place gamma thermometers of a full or partial gamma thermometer array of the Rolstad et al type, using methods of calorimetry.

If a full and symmetrically related system of gamma thermometers of the Rolstad type were in place in the reactor core then the average of all of the measurements could be related to the calorimetrically determined average LHGR of the fuel and an experimental ratio determined between LHGR and gamma thermometer signal to verify the theoretical value of this ratio. In this case the system would gain little or nothing in calibration precision through use of the traveling gamma thermometer of the instant application. For partial, non-symmetric or sparse systems of the Rolstad type of gamma thermometers, however, a calibration of average LHGR indicated against average LHGR from calorimetry can be insufficiently precise and calibration precision could be greatly increased by use of a traveling gamma thermometer of the instant application.

The traveling gamma thermometer of the instant application finds an important application in precision calibration of full systems of older types of unstable neutron measuring instruments such as fission chambers or self-powered neutron detectors which have not yet been or cannot easily be replaced by fixed gamma thermometer systems of the Rolstad type. In fact, traveling probe systems employing either fission chambers or self-powered neutron detectors have been found necessary in pressurized water reactors of two major types after the stability of these fixed neutron instruments proved unsuitable and have always been necessary to frequently recalibrate the very unstable fixed instruments used in boiling water reactors. For reactors employing such unstable fixed systems and for reactors using only traveling probes the traveling gamma thermometer of the instant application provides a superior method of local LHGR determination.

The traveling gamma thermometer described herein is useful in a proof-of-precision application to demonstrate the precision of the Rolstad type of gamma thermometer before a full system is in place. For example, if only three or four Rolstad units were in place in a reactor whose full, symmetrical compliment was 50 units from each containing 7 sensors, then the LHGR's calculated from these could be shown to be identical over a long period of time with LHGRs from a traveling gamma thermometer which had traversed the entire core and had been repreatedly consistent against overall calorimetric calibration as described above.

VIEWS OF DRAWINGS

DETAILED DESCRIPTION

Figure 1:
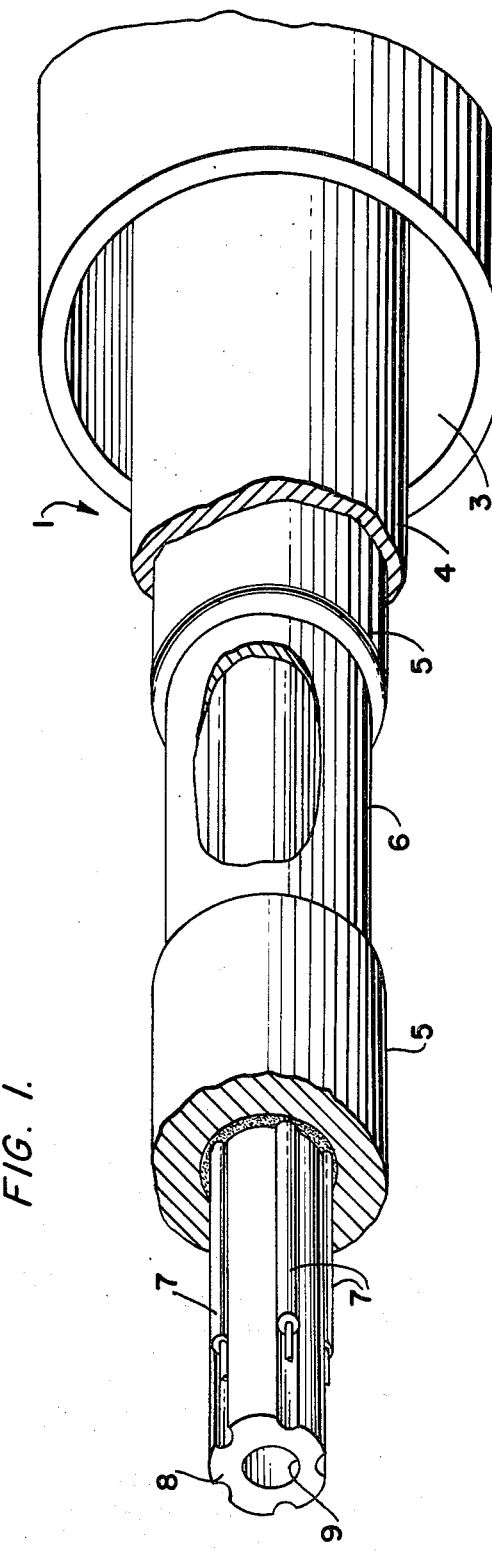
FIG. 1 is a partly exploded and perspective view of a multiple gamma thermometer string, such as that of the Rolstad et al application referred to above, modified to coact with the gamma thermometer of the instant application, and partly inserted into a bore extending through the core of a nuclear reactor.

A portion of the gamma thermometer string of the Rolstad et al application, shown at 1 in FIG. 1, is shown partly inserted into a fuel assembly tube or thimble 2, in a non-fueled location. Coolant flows through the fuel assembly tubes or thimbles at high rates of speed, and thus through the annular space 3 as well.

The gamma thermometer string includes sheath 4, which is swaged down into good thermal contact with the enlarged gamma sensor portions 5 and which bridges the reduced gamma sensor portions 6 (only one of which is shown). A plurality of thermocouple junctions, not shown, are used to sense the temperatures of the different gamma sensor portions, such as the constant diameter portions 5 and 6, and the resistance gap portions the resulting electric potentials are led off, by way of thermocouple leads 7, to instruments, not shown, located outside of the reactor. These thermocouple leads 7 are formed of conductors, electrically insulated in ceramic compacted powder, immune to the reactor environment, and covered by a metallic sheath. Thus, the construction of the ceramic insulated, metal sheathed thermocouple leads 7 is somewhat analagous to that of an electric heating element of an electric range, such as that sold under the trade name Calrod. This construction of thermocouple leads is in quite common use in nuclear systems.

The leads 7 for different thermocouples are supported and spaced inside the uniform bore of the gamma sensor portions 5 and 6 by means of a splined central support rod 8.

In accordance with the instant invention, the central rod 8 is provided with a bore 9. The bore 9 is used as an instrument tube, and one particular kind of instrument that can advantageously be inserted is the traveling gamma thermometer of the invention. The central rod 8, when modified by the provision of the bore 9, will be designated as an instrument tube establishing a path of movement therefor.

At this point it is important to note the size of the parts here discussed in order to understand this particular example of the invention. The fuel assembly tube 2 typically has an internal diameter 0.441 inches (11.2 millimeters). The central rod 8 typically has a diameter of 0.13 inches (3.3 millimeters). The bore 9 typically has a diameter of 0.079 inches (2 millimeters). Thus, the size of bore 9 is very small. It is so small that it will accommodate the 5/64 inch diameter lead of an ordinary pencil only with a push-fit. In other less miniature applications, discussed below, the traveling gamma thermometer itself is larger, having a diameter of ⅜ inch (10.5 millimeters).

The bore extending through the core of the nuclear reactor, through which the gamma thermometer travels, can assume several forms, as follows:

A. The bore can be in the form of an added coaxial longitudinal passageway, formed through the central rod of the gamma thermometer of the above-identified Rolstad application. A typical use of such a gamma thermometer is with the pressurized nuclear reactors manufactured by Combustion Engineering, but such a gamma thermometer is of general utility for use with other atomic reactors.

B. The bore can be that of an instrument thimble, such as those which extend through the core of pressurized atomic reactors manufactured by Westinghouse, and normally used for scanning by a traveling fission chamber.

C. The bore may be that of a dry guide tube extending through the core of a boiling water atomic reactor, such as those manufactured by General Electric, and normally used for scanning with a self-powered neutron detector.

D. The bore may be that of a wet guide tube, such as those used in the pressurized water atomic reactor manufactured by Combustion Engineering. Such a wet guide tube is filled with circulating reactor coolant and is normally loaded with fuel pins, but when left unfueled, is adapted to be scanned by the traveling gamma thermometer.

Figure 2:
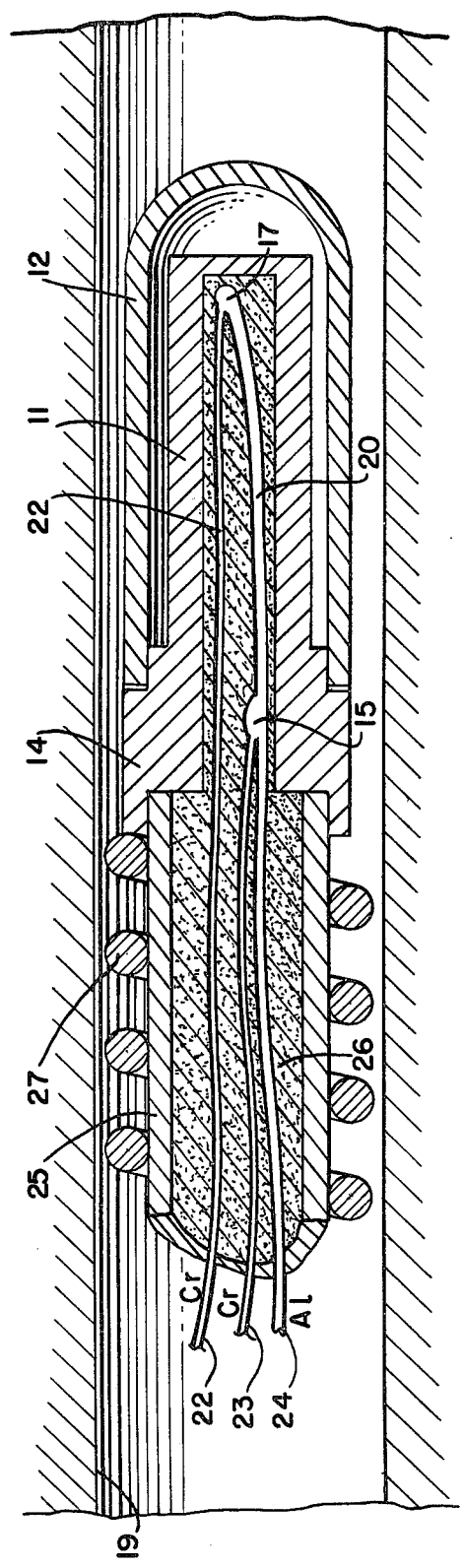
FIG. 2 is a cross section of the novel miniaturized traveling gamma thermometer suited for use in the environment of FIG. 1 and in other applications requiring the determination of linear heat generation rate.

A gamma thermometer of such size and construction as to permit it to be traversed through the bore 9 of the Rolstad et al gamma thermometer string of FIG. 1 is seen in FIG. 2.

The head or heat generator 11 of the gamma thermometer is surrounded by shield 12, which has the primary function of acting as a heat shield and also acts as a protective fairleader during the scanning operation through bore 19 of an instrument tube, corresponding to bore 9 of FIG. 1. The head 11 contains two thermocouple junctions 15 and 17, formed as welds between the wires 22, 23 and 24. Wires 22 and 23 are made of a suitable material, such as "Chromel", while wire 24 and short link 20 are made of another suitable and compatible material such as "Alumel". The differing thermoelectric properties of these two materials, as is well known in the art, are used to generate voltages at each junction, which are a measure of the temperature at the respective junctions.

The wires 22, 23 and 24 are encased in a sheath 25 which is attached to base 14 of the head 11. The left end of this sheath is available, outside of the reactor core, for connection of measuring instruments to wires 22, 23 and 24.

In order to prevent short circuiting of the wires 22 to 24 to each other or to the head 11 or sheath 25, they are insulated by a compacted powder 26.

The outside of sheath 25 is tightly wrapped with a helix of wire. The wrap 27 stiffens the sheath, which could easily buckle during handling without the wrap. It also permits the propulsion of the gamma thermometer through the bore which is to receive the miniature traveling gamma thermometer, such as bore 9 of FIG. 1, or 19 of FIG. 2, by means of a propulsion gear, not shown, which engages successive turns of the wrap 27 in the manner of a rack and gear. Other propulsion systems may drive with friction wheels directly on the outside of a sheath member 25.

The propulsion gear is located outside of the reactor in the area susceptible of service. The sheath 25 is long enough so that a considerable amount will still be stored on a storage drum, adjacent the propulsion gear, when the traveling gamma thermometer is extended as far into the reactor core as possible. The bitter end of the sheath, on the storage drum, is connected to electrical instrumentation. The head end of the sheath and the gamma thermometer become highly radioactive during the scan of the reactor core. When the scan is completed, the sheath is withdrawn from the core by means of the propulsion gear and momentarily stored on the storage drum, whereupon it is immediately propelled forward again, through an array of wye switches, into a different instrument tube for further measurements. The radioactivity induced in the thermometer and sheath does not interfere with measurements. During periods of non-measurement the probe and sheath are stored in a parking position where the induced radioactivity presents no problem.

During operation of the gamma thermometer, the ambient gamma radiation will heat up the various parts to an extent which depends upon the material involved. In order to simplify the explanation, it will be assumed that all parts are equally heated by the gamma flux and that the temperature of the bore 19 is uniform. The sheath 25 will thereupon assume a uniform temperature, loosing heat radially outwardly. The head 11 will be hotter at its right or tip end than at its left end, adjacent base 14, because the base 14 will act as the heat sink for almost all the heat generated in the right tip end and because there is a thermal resistance between the heat sink at base 14 and the heat source at the right end of head 11.

Thermocouple junction 17 will therefore be hotter than thermocouple junction 15, to an extent dependent on the ambient gamma flux. The electrical circuit which can be traced through wire 22, junction 17, short link 20, junction 15, and wire 23, constitutes a differential thermocouple between junctions 17 and 15. This differential thermocouple generates a voltage which is a measure of the temperature difference from the right end of the head 11 to the left or sink end 14. This voltage, proportional to temperature difference, is led to a meter, not shown, but outside the reactor core, by way of wires 22 and 23.

The temperature between the hot thermocouple junction 17 and the cold thermocouple junction 15 is closely related to the intensity of the ambient gamma flux, and is largely independent of the temperature of the base 14 except as thermal conductivity of the material varies slightly with temperature.

The base 14 should be at a temperature within about 50° C. of the bore 19 for high precision measurement. In order to avoid the risk of an improper reading, wire 24 also leads to the thermocouple junction 15, which acts as a hot junction for lead pair 23 and 24. Wire 24 leads to the outside of the reactor, whereat, in a manner not shown, but well understood by those skilled in the art, it is connected to a cold junction which in turn leads to one terminal of a meter, the second terminal of which is connected to wire 23. Thus, wire 23 is a common lead for two separate thermocouple circuits, one circuit of which measures the temperature difference along the head 11 and one circuit of which, with an external cold junction, measures the instrument sink temperature 14.

The reading of the sink temperature at junction 15 can be used to correct the calculation of ambient gamma flux obtained from the difference thermocouple comprising junctions 15 and 17. No correction is usually necessary if the sink temperature 14 is within about 50° C. of the temperature of bore 19. The use may prefer to withdraw and reinsert the unit to make better thermal contact, if high sink temperature indicates that thermal contact with bore 19 is poor.

The outside of head 11 and the inside of shield 12 are preferably polished, so that there is little transfer of heat therebetween by way of radiation. Furthermore, the space 21 between the head 11 and shield 12 is (a) made narrow and (b) is either evacuated or filled with a gas of low thermal conductivity, such as argon or krypton, so as to eliminate or reduce transfer of heat between head 11 and shield 12 by convection. The result of this is that the right end of head 11 looses heat principally by longitudinal heat conduction to base 14. The resulting thermal gradient along head 11 can be accurately calculated since the dimensions of head 11, machined on a lathe, are accurately known, and the head 11 is massive compared to the wire 22, short link 20 and compacted powder 26 within the head, which wire, link and powder have dimensions and characteristics which are not as well defined.

Thus, the embodiment of FIG. 2 has the advantageous characteristic that it has an accurately calculatable calibration, which can be checked against an experimental calibration. These two calibrations, which in agreement, can be used as a standard to calibrate other gamma thermometers.

Figure 3:
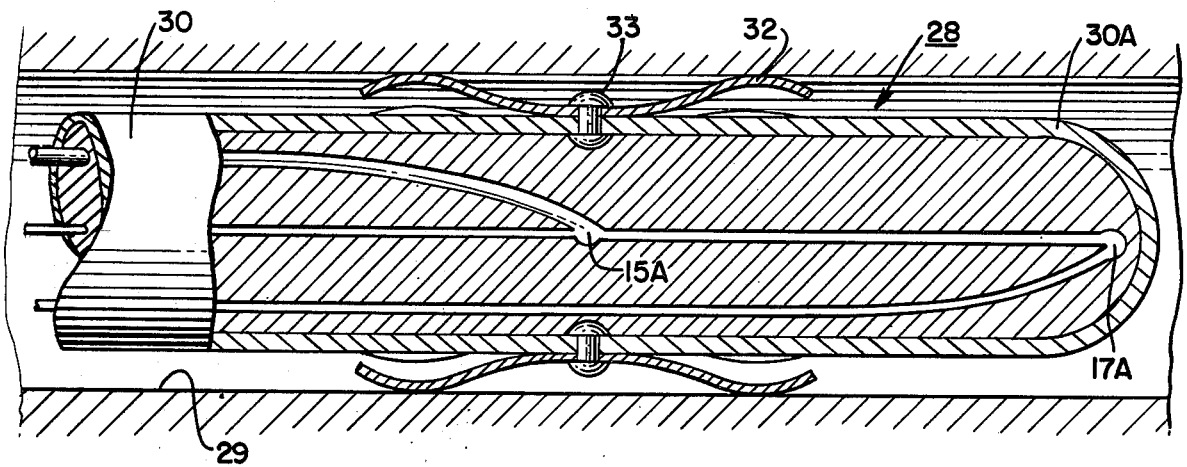
FIG. 3 is a longitudinal cross section of a modified miniaturized traveling gamma thermometer having a thermal bridge and centering means between the thermometer sheath and the bore in which it is inserted.

Another embodiment of gamma thermometer is shown in FIG. 3, at 28, inserted into bore 29. Here the sheath 30 is extended to form a head end 30A, which is hermetically sealed off with an electron-beam weld seal. The thermocouple junctions and wires inside the gamma thermometer 28 are similar to those described for FIG. 2. Junctions 15A and 17A correspond in construction and function to junctions 15 and 17, respectively, of FIG. 2.

A novel feature is the series of spring elements 32 which are fastened about the periphery of the sheath. The spring elements are shown fastened to the sheath by rivets 33. It will be understood that in the nuclear environment, rivets are not used, and welding would be taken for granted. However, welding does not show up well in a drawing, and rivets are substituted for purposes of exposition.

The spring elements 32 have two functions. They act as thermal bridges, so as to keep the temperature of the sheath adjacent rivets 33 close to that of the bore 29. They also act as centering means for the gamma thermometer within the bore 29. During operation, it is important that the right head end 30 of the gamma thermometer 28 does not touch the bore 29, as any contact would interfere with the thermal gradient between head end 30 and junction 15A. The centering action of spring elements 32 ensures that improper contact does not occur.

In view of the presence of the thermal bridge 32, one function of the thermoelectric junction 15A (with its remote cold junction, not shown) is that of monitoring to warn if there is something wrong about the sheath temperature rather than that of measuring, as in the FIG. 2 embodiment, for purposes of correcting the indicated temperature difference.

In use, the spring means 32 can be lubricated with "Neolube", a proprietary lubricant made of graphite in an organic suspension with alcohol for ease of distribution. Such a lubricant not only makes it easier to push the gamma thermometer through the instrument tube, but increases the thermal conductivity between the bore 29 and the gamma thermometer.

When no thermal bridge is used with a traveling gamma thermometer, it has been found that the use of Neolube lubricant will frequently provide sufficient thermal contact between the gamma thermometer and the bore of the instrument tube to permit accurate readings to be made. However, in each such instance the quality of the thermal contact must be qualified by observation of the absolute temperature of the gamma thermometer.

In case of the Rolstad type of gamma thermometer, when used inside a dry tube, the desire for such thermal bridge devices is more frequent, for two reasons. The accuracy is more affected by sink temperature variations in the biaxial heat flow system of Rolstad gamma thermometers than in the uniaxial heat flow devices of the instant application. In Rolstad the problem is often eliminated by water cooling which is not usual for traveling gamma thermometers.

Figure 4:
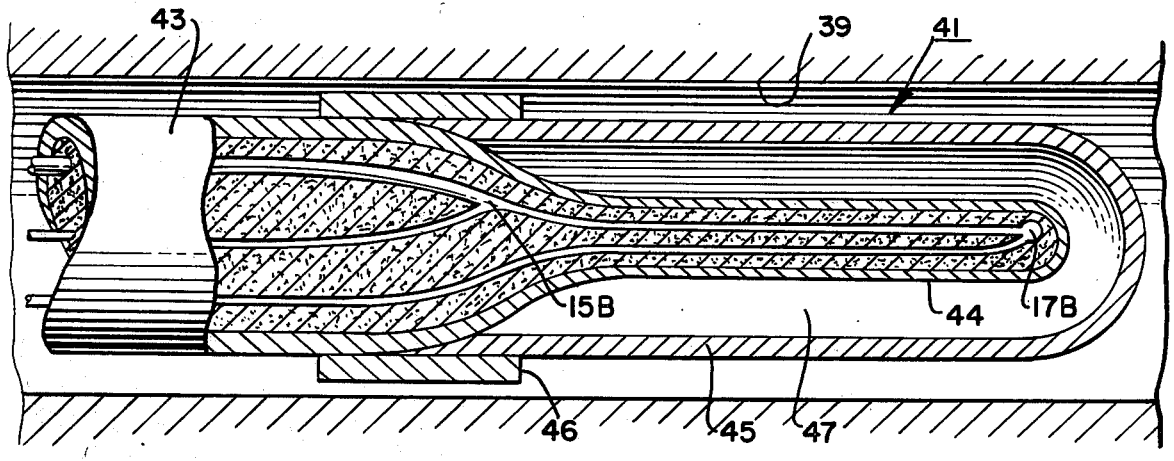
FIG. 4 is a longitudinal cross section of still another form of traveling gamma thermometer, in which a portion of the differential thermocouple is drawn out and covered with a thermal shield.

The embodiment of FIG. 4 uses a different type of thermal bridge and centering element and has a geometry which combines the simple swaged sheath construction of the embodiment of FIG. 3 with the excellent characteristics of the shielded head construction of the embodiment of FIG. 2.

Gamma thermometer 41 is inserted in bore 39. The sheath 43, containing thermocouples 15B and 17B has been swaged down to a greatly reduced cross section at the head 44. Such swaging down, when properly done, by laminar flow, changes the scale inversely on the longitudinal and transverse axis without altering the thermocouple properties. The thin and fragile head 44 is covered by a protective shield and fairleader 45. The thermal bridge and centering means, which acts as a heat sink, is in the form of a highly conductive collar 46 which has only a small clearance with the bore 39. The small clearance ensures that collar 46 will touch the bore 39, to establish thermal contact, and it will also prevent the axis of the gamma thermometer 41 from being greatly cocked with respect to that of the bore, so that the shield 45 will not touch the bore 39.

The space 47 between the swaged down portion or head 44 and the shield 45 can be evacuated or filled with argon or krypton. In an actual embodiment, when the gamma thermometer was inserted into an atomic reactor core operating at full power, the right end of the tip 44 was about 40 degrees hotter than its left end, adjacent collar 46. It is estimated that, for this condition, of all the heat energy liberated within the materials of the right end of head 44 (principally the material of the sheath) about 1% was lost to the shield by radiation, while about 15% was lost to the shield by convection through an argon gas filling. The remainder flowed by longitudinal conduction through the length of head 44 to the heat sink at collar 46.

Figure 5:
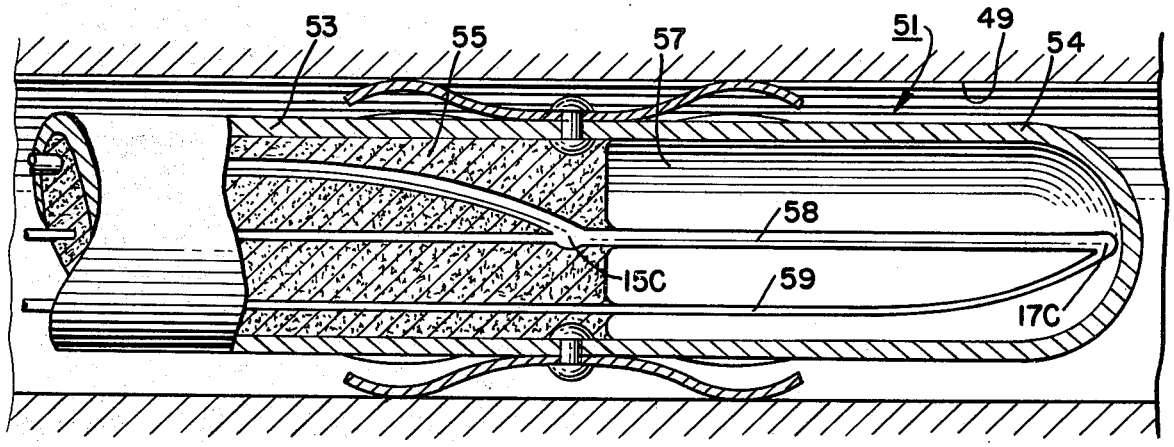
FIG. 5 is a longitudinal cross section of a traveling gamma thermometer similar to that of FIG. 3, but modified so that the longitudinal thermal gradient is determined by the characteristics of the thermocouple wires, rather than by those of the sheath with insulation packing and thermocouple wires.

The embodiment of FIG. 5 is similar to that of FIG. 3 but has considerably higher sensitivity.

The gamma thermometer 51 is inserted in bore 49. The sheath 53 contains a compacted insulating powder 55 which supports and insulates the thermocouple junctions 15C and 17C. At the fore end 54 of the sheath 53, the powder has been removed to leave the space 57, which can be evacuated or filled with a gas of poor conductivity.

In this embodiment it is the wires 58 and 59 which form the sensors of the gamma radiation, by internally heating up in the presence of the gamma flux, and which also provide thermal conduction along a longitudinal path to a heat sink. The head end 54 of the sheath 53 acts as a heat shield for wires 58 and 59.

In this embodiment, therefore, the differential thermocouple has two functions—first, to capture gamma radiation and convert it into heat and, second, to indicate resulting differential heat. This contrasts with the other embodiments, discussed above, wherein the differential thermocouple is used, essentially, only for the latter function.

It is apparent from what has been described above that the herein described traveling gamma thermometer is of general utility. Besides being of use to calibrate an array of gamma thermometers, it can be used to calibrate an array of other types of nuclear activity measuring instruments, such as self-powered neutron detectors. Furthermore, it can be used by itself, either as a stationary and permanently installed measuring instrument, or as a continuously available traveling measuring instrument.

What is claimed is:

1. In combination with a radioactive environment having a plurality of radiation measuring zones within which sensor devices are mounted for monitoring radiation activity, a traveling probe, means mounted in each of the sensor devices for guiding said probe along paths of movement through each of the zones, and means connected to the probe for calibrating the sensor devices in response to travel of the probe through said zones, the improvement residing in said sensor devices being of the gamma radiation measuring type and said probe including heat sink means for establishing a reference temperature region to which heat flows, elongated heat generating means extending from the heat sink means along each of the paths of movement for establishing a heat flow path to the heat sink means, means for thermally isolating the heat generating means from the sensor device, thermocouple junction means for sensing differential temperatures between the heat sink means and the heat generating means, signal conducting means connected to the junction means for transmitting signals therefrom to the calibrating means externally of the radioactive environment to adjust calculation of power from signal outputs of the sensor devices, and an elongated flexible sheath thermally connected to the heat sink means and protectively enclosing the signal conducting means.

2. The combination of claim 1 wherein each of said sensor devices includes a gamma radiation absorbing body having axially spaced thermal resistance portions therein, multiple junction thermocouple cables, and a support element operatively positioning said cables on the body, said support element having a bore extending therethrough forming one of the paths of movement for the probe.

3. The combination of claim 2 including propelling means mounted on the sheath for displacement of the probe along the paths of movement.

4. The combination of claim 2 wherein the heat sink means comprises a thermally conductive centering spring connected to the sheath and in sliding contact with the support element within the bore.

5. The combination of claim 4 wherein said thermal isolating means comprises a shield extending from the heat sink means in enclosing relation to the heat generating means.

6. The combination of claim 5 wherein said thermal isolating means further includes a low thermally conductive gas space between the shield and the heat generating means.

* * * * *